United States Patent Office 3,392,647
Patented July 16, 1968

---

3,392,647
MEANS FOR ELECTRICALLY DRIVING TWO ELEMENTS IN PARALLEL THROUGH PROPORTIONAL DISTANCES
Ralph Bartholomew, 33 Walbrook Road,
Scarsdale, N.Y. 10583
Filed Oct. 21, 1965, Ser. No. 499,568
6 Claims. (Cl. 95—18)

---

ABSTRACT OF THE DISCLOSURE

Electrical driving means for moving two elements on parallel straight tracks, particularly moving back and lens of a stereoscopic camera. The movement is by separate electric motors and the second motor driving the lens board drives at a proportional but slower speed than that driving the camera back, the proportionality being determined by the distance between tracks for focusing the camera. When a lined screen is used in the back of the camera as a parallax barrier it is driven in synchronism with the motion of the camera back and at a speed determined by a ratio of camera back speed to screen line width.

---

Background of the invention

The stereoscopic effect from a single photograph in a single plane has been produced by superimposing on the image produced by special scanning of a line or lenticular screen on transparent material, such as plastic or glass. Objects at different distances from a primary focal plane of the scene photographed will be recorded on the photograph at slightly different positions so that when the photograph is viewed through a suitable viewing screen, normally in contact with the photograph or even integral with the print, they will be perceived slightly differently by the two eyes of the person viewing the photograph, and hence the well known phenomena of stereoscopic or binocular vision results and the photographic image appears to have depth just as if there were two stereoscopic photographs viewed through suitable stereoscopic viewers.

In the past a mechanical linkage has been proposed in which a camera scans around the arc of a circle with the axis of the camera and lens always pointing to the central point of focus of the object being photographed. A typical mechanical linkage of this type is described and claimed in the patent to Friedmann, 2,175,114. This requires a lined taking screen and also a viewing screen superimposed or in close proximity to the final photograph. Stereoscopic effects are produced but the definition is precise only for a single object distance.

Summary of the invention

The scanning device of the present invention may be used with a lenticular screen, the cylindrical lenticular lenses normally being vertical and of course very tiny, and produces by separate electrical driving means a motion of the camera back containing the photographically sensitive surface and the camera lens along two parallel straight lines. In addition to its utility with lenticular screens, the present invention has the additional advantage that it can be used with a lined taking screen and produces precise definition for all object distances. Either type of taking screen can be used, depending on other conditions, and this choice and additional flexibility is an important, practical advantage of the scanning mechanism of the present invention.

The action of the scanning camera can be thought of, in oversimplified terms of course, as if the camera were moved to successive positions while maintaining the desired focus. In the different positions rays of light coming through the lenticular or lined screen will come from slightly different angles depending on the location of the various objects in the field being scanned with respect to the plane of central focus. Then when the same viewing screen is used to view the final photograph, as different parts of the picture are viewed by each eye or different portions thereof are so viewed, the stereoscopic effect results.

It will be noted that the movement of the camera lens in a straight line parallel to the camera back constantly changes its orientation with respect to the rays coming from different parts of the scene being scanned, and this produces the stereoscopic effect. According to the present invention, the elements carrying the camera back and the camera lens are moved by separate electrical drives at different, although proportional, speeds. When a lined screen is used, a third electrical drive or electro-mechanical drive moves the screen at a very much slower rate, which is determined by the total travel of the camera back and the width of the lines on the lined screen. It is this precisely defined motion of the lined screen that maintains definition at different object distances.

Description of the preferred embodiments

Figure 2:
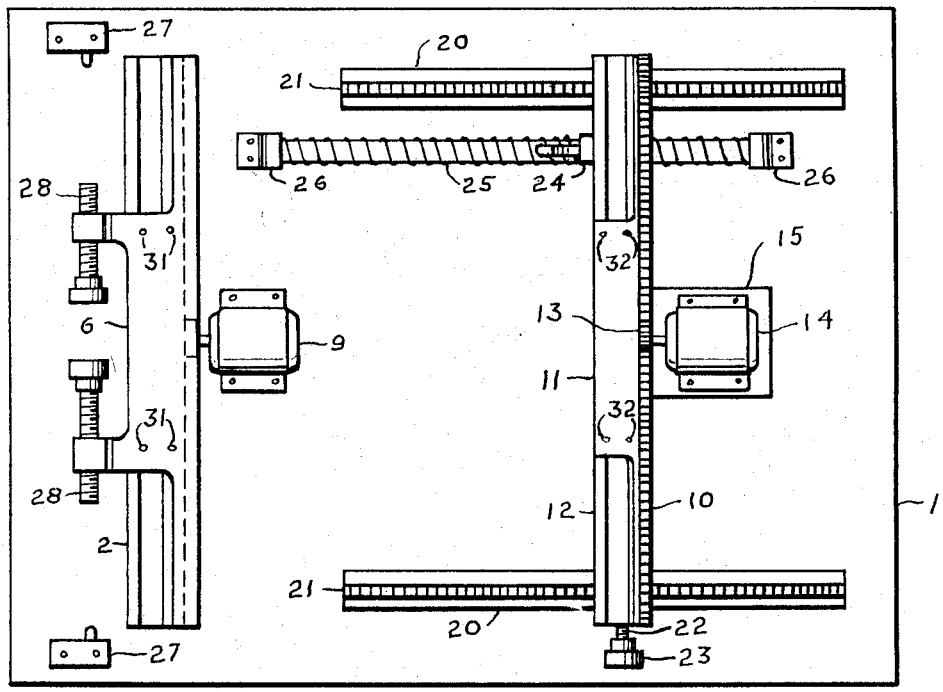
FIG. 2 is a plan view with the camera removed.

Both figures of the drawing are semi-diagrammatic in form as the exact shape and design of the mechanical elements is to a large extent immaterial, and conventional electronic connections are not shown in order to avoid obscuring the drawings. As many elements in both figures are the same, they will be given the same reference numerals in each figure.

The figures show a base 1 upon which is mounted a track 2 provided with a dovetailed groove in which a slider 6 moves. This slider is provided with holes 31 on which the camera back 19 is fastened. The right hand edge of the slider 6 is provided with a rack 7 engaging a pinion 8 driven by the main driving motor 9. This motor is supplied with a source of current, not shown, and, if desired, may be provided with means for varying the voltage applied to the motor 9 and hence its speed to provide for different scanning times.

A second slide 11 is provided with a dovetailed extension which slides in a corresponding groove in a track 12. The slider is provided with a rack 10 engaging a pinion 13 driven by a separate, independent motor 14 which in turn is mounted on a bracket 15 attached to the track 12. This slider 11 is also provided with holes 32 on which is mounted the camera lens board, carrying lens 30.

Two tracks 20, provided with racks 21, are mounted on the baseboard and the track 12 slides along these tracks by means of a rod 22 provided with a knob 23 which carries gears (not shown), meshing with the racks 21 so that the track 12 can be moved at right angles to the movement of the slider 11. The track carries a sliding contact 24 moving over the wires 25 of a potentiometer which is mounted at its two ends 26 on the board 1. The potentiometer is connected to the source of voltage of motor 9 and the slider picks up a voltage which controls the speed of the motor 14 through conventional control circuits (not shown). As a result, the motor 14 turns at a speed which is slower than but proportional to the speed of the motor 9. The speed of 14 is determined by the position of the lens board on the slider 11.

The travel of the slider 6 and therefore the proportionately shorter travel of the slider 11, depending on the position of the lens 30 to focus the camera on a plane of sharpest focus in the object to be scanned, is determined by two screws 28 which are mounted in projections on the slider 6. At extremes of the travel these screws strike micro-switches 27 starting and stopping the motor 9.

If a lenticular taking screen is used, the radius of curvature of the cylindrical lenses determines the angle by which rays at different points in the object plane pass through the camera, and of course the adjustment of the screws 28 must correspond to the particular lenticular taking screen used.

Figure 1:
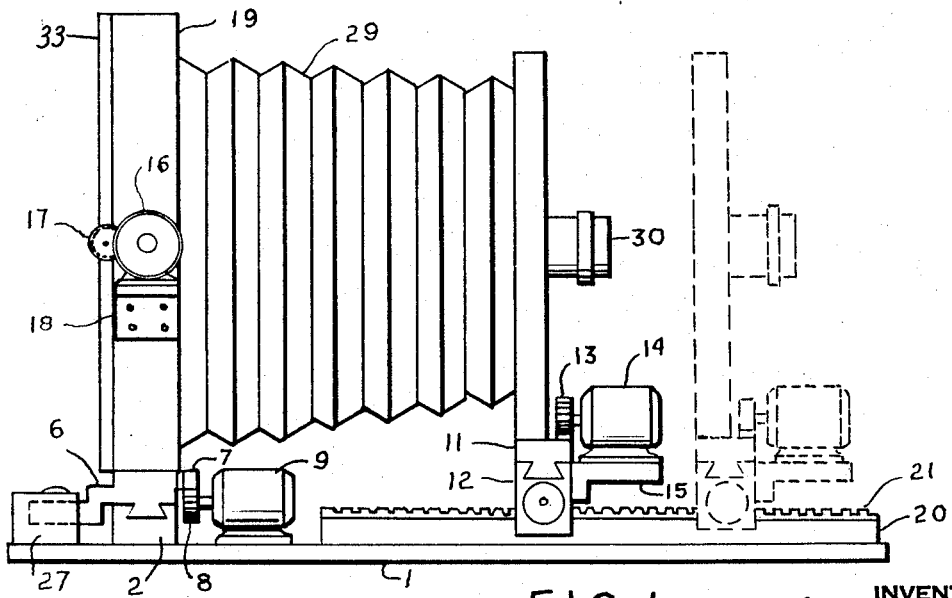
FIG. 1 is an elevation of a camera and camera carrying elements, the lens being shown in two positions, the second in dashed lines.

If a lined screen is used in place of a lenticular screen, then it is necessary to move it with respect to the photographic surface in the camera back. This is shown in FIG. 1, the lined screen being at 33 and being moved by a fine pitch screw driven by a gear 17 from a pinion on a motor 16 which in turn is mounted on a bracket 18 on the camera back. The motion of the screen is very small in comparison to the total travel determined by the adjustment of the screws 28 and is influenced by the width of the lines on the lined screen. A very small motion is obtained by a fine pitch screw gearing and by the speed of rotation of the motor 16 which may be a relatively slow speed. The motor receives its power from the same source of power as does the motor 9 but its speed is adjusted by a conventional circuit so that the motion of the lined screen is synchronized with the motion of the slider 6. It should be understood that the screen is moved through a much smaller total distance than the slider 6 moves, but it will remain in synchronism. Each width of lined screen for each total travel of the slider 6 requires a particular screen travel and hence, of course, a particular speed of the motor 16. When properly synchronized, the definition produced by the lined screen acting as a parallax barrier remains constant and precise for all object distances in the scene being scanned. This improves greatly the precision as compared with the Friedmann patent discussed above and makes a lined screen practical for precision work.

It will be noted that the electric motors 9 and 14 turn at predetermined ratios depending on the position of the track 12 and hence slider 24. In other words, this ratio is determined by the adjustment of the camera for sharp focus in a predetermined object plane. The electric motors have substantially little or no backlash and precise proportional movement is obtained, which is more difficult with mechanical linkages such as is shown in the Friedmann patent, where backlash and play can occur. This is one of the advantages of the present invention in addition to the advantage of being able to use either a lenticular screen or a lined screen, depending on which screen is chosen for particular purposes.

The electrically driven elements of the present invention have been described in conjunction with a camera for taking photographs for stereoscopic viewing. As pointed out above, this is the most important single field of utility of the present invention. However, the organization of elements and their relative motion by the electric motors is not limited to this particular use and can be empoyed wherever travel of the same nature in scans is required. For example, instead of a camera back there may be a source of radiation to produce a projector. The source may be visible light or any other form of radiation, for example an X-ray tube. These other typical uses are not intended to restrict the invention but are merely illustrative of the fact that the organization of elements is not limited in its broader aspects to a camera for stereoscopic photography and so represents an organization having wide flexibility for various uses.

The exact mechanical construction of the elements is not particularly important, a typical construction being shown in the drawings. Thus, for example, instead of dovetailed sliders and tracks, the tracks may be rods or any other suitable shape, the essential feature of course being that parallel motion in the proportion determined by the position of the second slider takes place.

The control means for the driving of the second motor 14 may be of any conventional type. Thus, for example, if DC motors are involved, the potentiometer 25 can constitute an impedance, the potentiometer acting as a shunt control. Another speed control circuit using silicon controlled rectifiers with the votage picked up by the slider 24 acting as a control is also useful and for some purposes preferable. Other conventional controls, such as controls utilizing thyratrons can also be employed. It is an advantage of the present invention that the particular design of control of motor 14 and also of motor 16 is not limited to any particular circuit. This gives a desirable flexibility to the invention which is a practical advantage.

I claim:
1. An organization for electrically driving two elements parallel to each other through proportional distances, comprising in combination,
   (a) a base framework,
   (b) a straight first track near one end of the framework and stationary with respect thereto and a second straight track parallel to the first track and movable toward and away from the first track at right angles thereto,
   (c) sliders movable along each of the two tracks and separate, independent electrical driving means for each slider,
   (d) a source of electrical energy of predetermined and adjustable value for the separate and independent electrical driving means of the slider on the first track and control means connecting the electrical energy to source for the first driving means to the separate, independent electrical driving means for the slider on the second track,
   (e) means for moving the second track to and away from the first track, the control means for the electrical driving means of the slider on the second track being actuated proportionally to the movement of the second track.

2. An organization according to claim 1 in which the sliders on the two tracks are provided with racks and the electrical driving means for each slider comprises respectively a separate motor and pinion driven thereby meshing with the rack for the particular slider.

3. An organization according to claim 1 in which a stereoscopic camera is mounted with the camera back attached to the slider on the first track and a lens attached to an element on the slider of the second track.

4. An organization according to claim 2 in which a stereoscopic camera is mounted with the camera back attached to the slider on the first tracks and a lens attached to an element on the slider of the second track.

5. A stereoscopic camera organization according to claim 3 in which the camera back carries a lined screen, constituting a parallax barrier for stereoscopic effect, the slider on the first track is limited by adjustable stops to a predetermined total travel, and separate means are provided for moving the lined screen to whereby a stereoscopic effect is produced, said means moving the lined screen in accordance with a linear function of camera back total travel and lined screen line width.

6. A stereoscopic camera organization according to claim 4 in which the camera back carries a lined screen, constituting a parallax barrier for stereoscopic effect, the slider on the first track is limited by adjustable stops to a predetermined total travel, and separate means are provided for moving the lined screen to whereby a stereoscopic effect is produced, said means moving the lined screen in accordance with a linear function of camera back total travel and lined screen line width.

References Cited

UNITED STATES PATENTS

| | | | |
|---|---|---|---|
| 1,882,424 | 10/1932 | Ives. | |
| 2,158,660 | 5/1939 | Kanolt | 95—36 |
| 2,175,114 | 10/1939 | Friedmann. | |

JOHN M. HORAN, *Primary Examiner.*